Oct. 26, 1926. 1,604,411
R. P. HERROLD ET AL
TRIMMING MACHINE FOR CLAY BLOCKS
Filed June 14, 1924 7 Sheets-Sheet 1

INVENTOR
Thomas V. H. Moorhead
Russell P. Herrold
BY
Joseph F. O'Brien
ATTORNEY

Fig. 8.

Patented Oct. 26, 1926.

1,604,411

UNITED STATES PATENT OFFICE.

RUSSELL P. HERROLD AND THOMAS V. H. MOORHEAD, OF ZANESVILLE, OHIO.

TRIMMING MACHINE FOR CLAY BLOCKS.

Application filed June 14, 1924. Serial No. 719,993.

This invention relates to improvements in trimming machines for clay blocks.

Clay blocks, such as green tile, when delivered by a press from the mold have roughened corners or mold seams formed at the junction of the top surface with the side and end edges. These clay or green tile blocks have heretofore been fettled or smoothed by hand with sand paper as the smoothing or abrasive material. This has been a slow and tedious process and it has been found necessary to renew the sand paper very frequently.

It is a great desideratum to produce a practical machine which will remove these rough corners with speed and accuracy and it is one of the objects of this invention to produce a machine which will effectively and positively bevel the corners of such blocks with great speed and accuracy, thus removing these roughened edges or mold seams.

It is not economically practical in a machine for the purpose specified, to use sand paper or even steel cutters because the poor wearing qualities of such materials make it necessary to stop the press too frequently in order to renew or sharpen the same. We have discovered that by the use of cutters composed of carborundum, the trimming of the clay blocks by machine may be economically accomplished and a material for the cutter is provided that is hard, durable, relatively inexpensive and which need not be frequently renewed or sharpened.

Another object of this invention is the production of a machine having means for engaging and positively moving blocks of clay, such as green tile, and bevelling the same by the use of such carborundum cutters during such positive movement.

Another object of this invention is to produce a machine having means for moving such tiles in a rectangular path and cutting or bevelling all the corners during such rectangular movement. This rectangular movement of the tile is preferably accomplished by engagement of the edges of the same and the positive movement thereof first in a path parallel to or in the same direction as the delivery movement by the press, and thence in a path at right angles to said first mentioned movement, means being provided for bevelling or cutting the side edges simultaneously with the first of said movements and for bevelling or cutting the end edges simultaneously with the second of such movements of the tile.

Another object of this invention is to provide a machine for the purpose specified with means, preferably operating in synchronization with a tile press, for engaging at their end edges and positively moving a series of tiles immediately upon delivery thereof by the carrier frame of the press and cutting or bevelling two parallel corners during such positive, synchronized movement, and preferably providing means also synchronized with the press mechanism for engaging the side edges and positively moving the blocks at right angles to the initial movement and cutting or bevelling the end edges during such positive, synchronized movement.

Another object of this invention is to minimize the spoilage of tiles by the utilization of cutting elements in pairs, one member of each pair being adapted to take off an initial cut or portion of the ultimate amount of clay to be removed and the other member of the pair being a follow-up cutter adapted to take off the finishing or ultimate cut.

Another object of the invention is the provision, in combination with the positive engaging and moving means above specified, of a conveyor belt, the movement of which is intermittent and synchronized with the movement of the mechanism for the movement of the tile at right angles as hereinabove mentioned and with the movement of the press.

Another object of this invention is to provide mechanism for the movement of the tile which may be operated from the press and which preferably may be connected up to the cam of the press.

Still another object of our invention is to provide in a machine of the character specified effective means for guiding the tile blocks during the trimming thereof and preferably comprising a series of guide bars or dividing strips which form grooves or channels through which the blocks are positively moved by engaging fingers into engagement with the cutters, and we preferably arrange springs in each groove at one side of a guide bar to align the blocks without injury thereto.

Another object of this invention is the provision, in a machine of the type specified, of means for reciprocating the engaging fingers to positively move the tile blocks into engagement with the cutters, preferably combined with means for automatically lowering fingers into engagement with the edges of the tile blocks upon movement of such fingers in one direction and for automatically raising such fingers upon movement thereof in the opposite direction.

Still another object of our invention is to produce a tool-holder for cutters which will enable the adjustment of the carborundum cutters in relation to the work and preferably will provide means for holding two pairs of cutters, one pair on each side of guide bars or dividing strips and enabling independent adjustment of each pair.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Referring now to these drawings, which illustrate a preferred embodiment of our invention, 1 indicates a trimming bed for clay blocks which may be provided on any suitable flat surface and in the preferred embodiment shown is formed on the metallic top plate of a steam table 2 heated by steam boxes 3—3$^a$ through which steam is passed by pipes 4—4$^a$ from any suitable source of supply not shown.

Our block-trimming machine may be adapted to be used in combination with any form of block-forming device, and, as shown, the steam table 2 is supported by legs 2$^a$ in a position adjacent to a tile-press 5 of a conventional power type. In this embodiment, the upper surface or trimming bed of the table is, as shown, flush with the bed 5$^a$ of the said tile-press 5 which has press mechanism including a pressing-plunger 6, clay-mold 7 and carrier-slide 8, and the press mechanism also includes a cam 9 on a shaft 10, rotated from any suitable source of power not shown. The press 5 operates in the usual way to press within the molds 7 charges 7$^a$ of clay sufficient when compressed to produce a green tile T. When so formed the green tiles T are lifted upwardly by a lifting plunger 11 and then moved or slid forwardly by the carrier-slide 8 to the trimming-bed 1. On the trimming-bed 1 is supported block-trimming cutters C preferably composed of carborundum, which material we have found has such wearing qualities as are required to make the use of cutters under the working conditions met in this machine economically advantageous, viz, that will make it possible to use the same cutters without sharpening or changing for a relatively long period of time, and is furthermore relatively inexpensive, it being understood that the stoppage of work, which in this case means the stoppage of the press, results in an expensive loss or waste of time, and that for this reason it is impractical to use sand paper which would have to be renewed every half hour or even steel cutters which only wear for a relatively few hours, whereas the use of carborundum cutters enable effective work to be done for approximately a week without renewal. These carborundum cutters are preferably arranged in pairs, a pair of such cutters being mounted to contact or engage each corner of the clay block, as hereinafter more particularly described, and one member of each pair being adapted to take from the corner of the block an initial cut or portion while the other member of the pair is adapted to take off a final or finishing cut. This arrangement of the cutters enables the lengthening of the time period during which the cutters may be continuously used without changing or sharpening.

In the preferred embodiment shown, the compressed clay blocks or green tile T are, after delivery to the trimming bed, positively engaged and moved in a rectangular path and during such movement the tile is positively forced into contact with the said cutters C which are located in the said path of movement and which bevel the corners of the green tile blocks T. The roughened corners or mold seams formed at the junction of the top surface with the edges of the green tiles are thus removed. The said rectangular movement of the green tile hereinabove referred to comprises an initial or primary end-wise movement of the plurality or series of such tile blocks delivered by the press through a corresponding number of primary independent grooves or channels G preferably in a direction parallel with the delivery movement by the press, and then a secondary movement in a line at right angles to the first movement of the plurality or series of tiles through a single secondary groove G′ formed at right angles to the channels first mentioned. Each of such grooves is provided at opposite sides with means for cutting or bevelling the top corners of the green tile blocks, the side-edges of the series being cut or bevelled in the series of grooves G and the end edges of the series of green tile being cut or bevelled by the cutters in a single groove G′.

In the embodiment illustrated, four primary grooves or channels G are formed by parallel guide bars B and in order more effectively to align the tile blocks T without injury thereto, we preferably provide a spring S at one side of each of the grooves for resiliently forcing the tile block toward the opposite guide bar, and we preferably provide holders H for the cutters, each holder being arranged to position a pair of holders within a groove and the inner holders H′ being double holders adapted to hold two pairs of cutters, one pair at each side of an interior dividing bar B and to properly position such pair of cutters in the path of the corner of the tile block as the same are moved through the said grooves G.

In the said preferred embodiment illustrated, the tile blocks T are preferably engaged at their edges and forced through the grooves G and into contact with the cutters C which cut the edges of the tile during such positive movement therethrough and, as shown, we have provided edge-engaging fingers F which are supported to travel in a reciprocating movement over the bed 1 and to be raised and lowered intermittently. Two sets of such edge-engaging fingers F—F′ are preferably provided, one set for moving the tile blocks T through the plurality of grooves G in the direction of the delivery movement and the other through the single groove G′ at right angles thereto. Preferably each of these reciprocating edge-engaging fingers are combined with means for automatically lowering the fingers into engagement with the edge of the tile blocks at the start of the movement of the fingers in one direction and retaining such fingers in such lowered position during the continuance of such movement, and for automatically raising such fingers at the start of the opposite movement and retaining the same in such raised position during the continuance of such opposite movement.

Figures 1, 15:
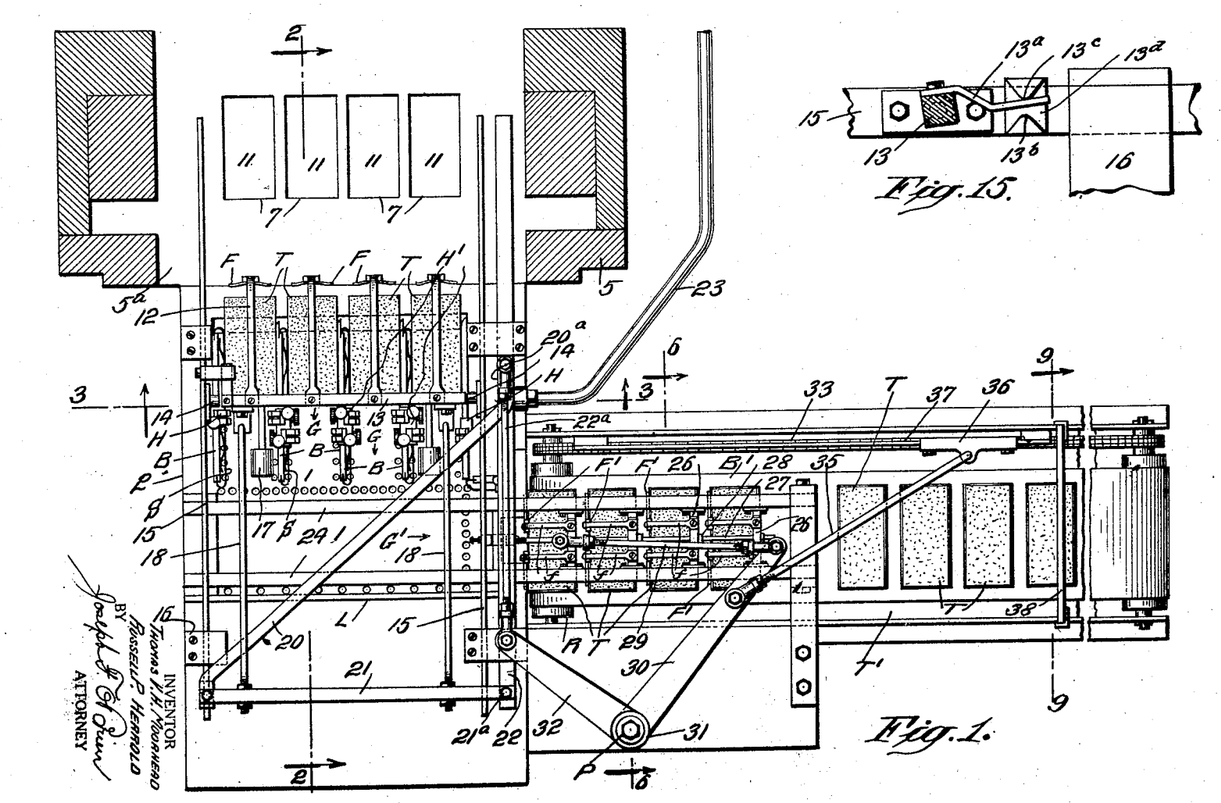
Fig. 1 is a plan view of a machine embodying our invention.
Fig. 15 is a section on the line 15—15 of Fig. 3 looking in the direction of the arrow.

Our preferred form of actuating mechanism for actuating the first set of edge-engaging fingers F comprises a pair of slide bars 15 supported in elevated position by brackets 16 having grooves 16ª formed in the upper ends thereof, the edge-engaging fingers being mounted at the ends of hook-shaped rods 12 which are connected at their rear ends to a horizontally-disposed rock-bar 13 pivoted at opposite ends in bearings 14 on the slide bars 15, the fingers F preferably being balanced on said bar by weights 17. The bars 15 and rock-bar 13 constitute a reciprocable frame for the mounting of the edge-engaging fingers F, and in the preferred embodiment shown said frame is reciprocated and the fingers automatically raised by and during a forward movement of the slide through the action of the rods 18 connected to rocking arms 19 projecting to one side, and, as shown, below the pivotal point of the rock-bar 13, the effect being that movement of the rods will first rock the bar 13 to raise or lower the edge-engaging fingers F, depending upon the direction of movement thereof, and will thereafter move the slide frame on which such fingers are mounted. Thus when the rods 18 are moved outwardly away from the press, the rock-bar 13 is rocked to depress the fingers on the bed of the press behind the tile-blocks T and continued movement will thereafter move the finger-mounting slide-frame, of which the rock-bar 13 forms a part, so that the fingers will engage the edges of the tile and positively move the same outwardly through the grooves G and into contact with cutters C arranged, as aforesaid, in pairs on opposite sides thereof. These cutters C will during such movement cause a bevelling of the opposite side edges of the said tile blocks. After movement through the said grooves G of the said tile blocks T, a movement in the opposite direction of the slide-frame through the action of the rods 18 will first rock the bar 13 to automatically raise the fingers and will thereafter move the slide-frame in the opposite direction, the bar 13 being retained in its rocked position to hold the fingers F in elevated position. The raising and lowering movements of the fingers are preferably limited by providing the rock bar 13 with an arm 13ª (see Fig. 15) which rocks between abutments 13ᵇ and 13ᶜ in a head 13ᵈ, and the movement of the tile T by the fingers F is limited by the strip L to cause such tile to assume a position in registration with the grooves G' and the cutters located at the edges thereof.

Figure 2:
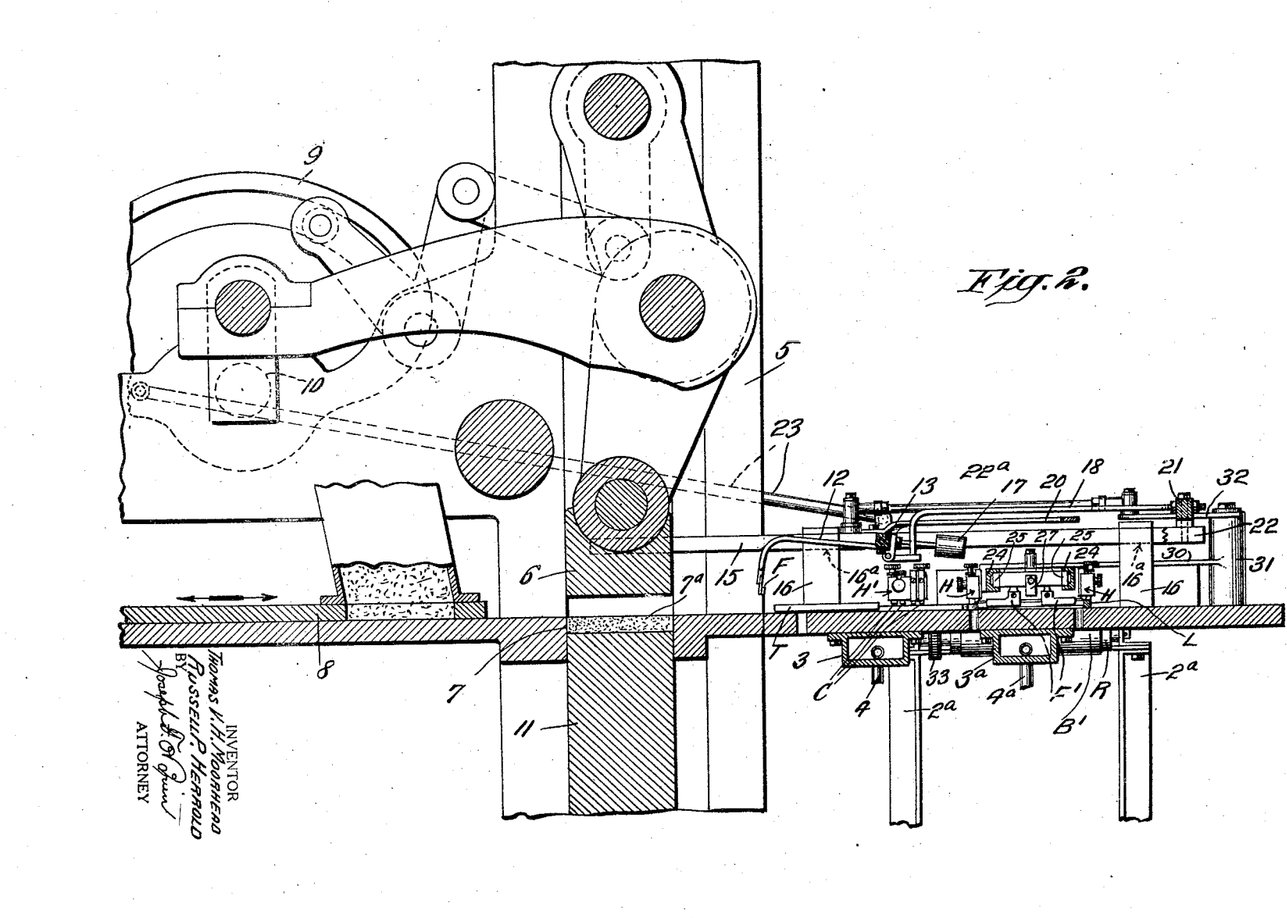
Fig. 2 is an enlarged vertical section on the line 2—2 of Fig. 1 looking in the direction of the arrow.
Figures 3, 9:
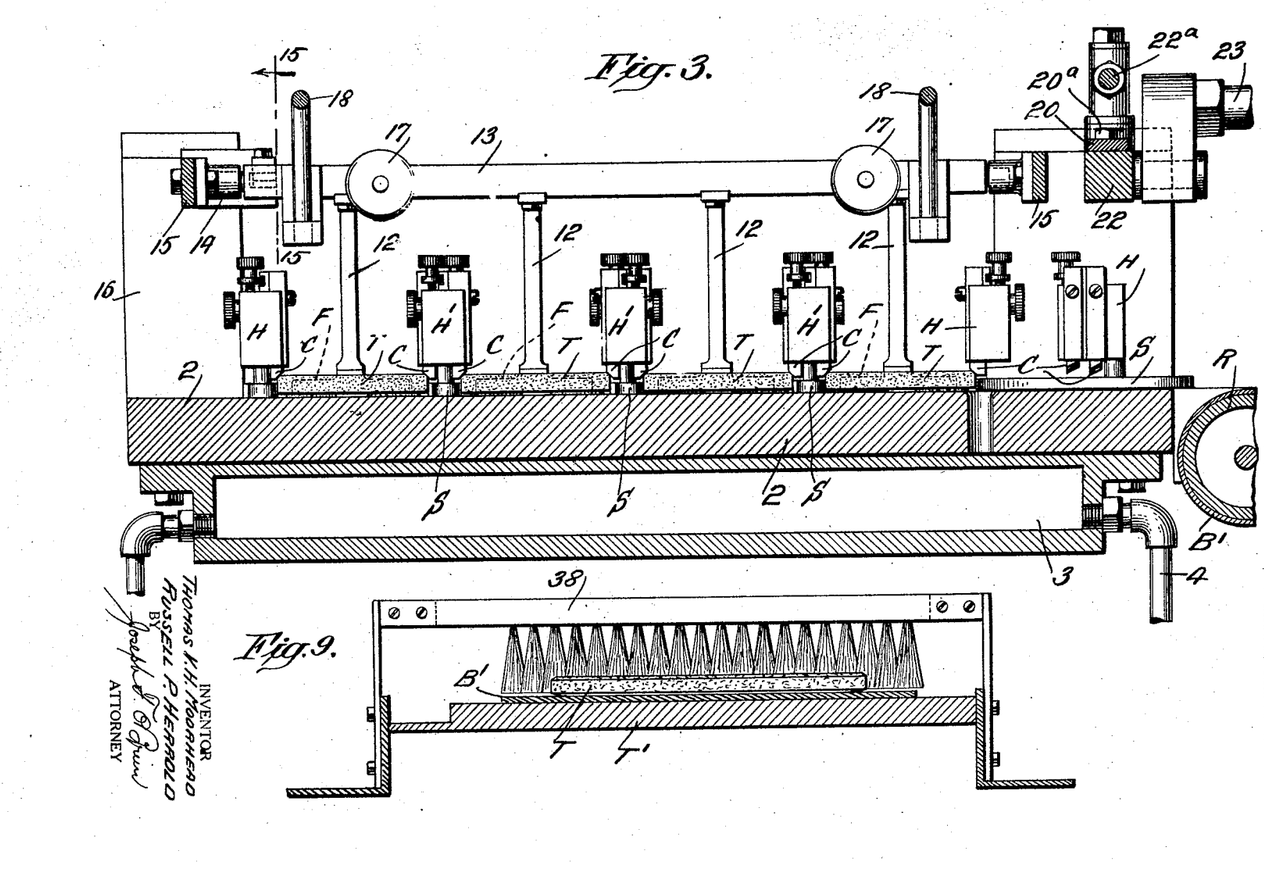
Fig. 3 is an enlarged vertical section on the line 3—3 of Fig. 1 looking in the direction of the arrow.
Fig. 9 is a section on the line 9—9 of Fig. 1.
Figures 4, 5:
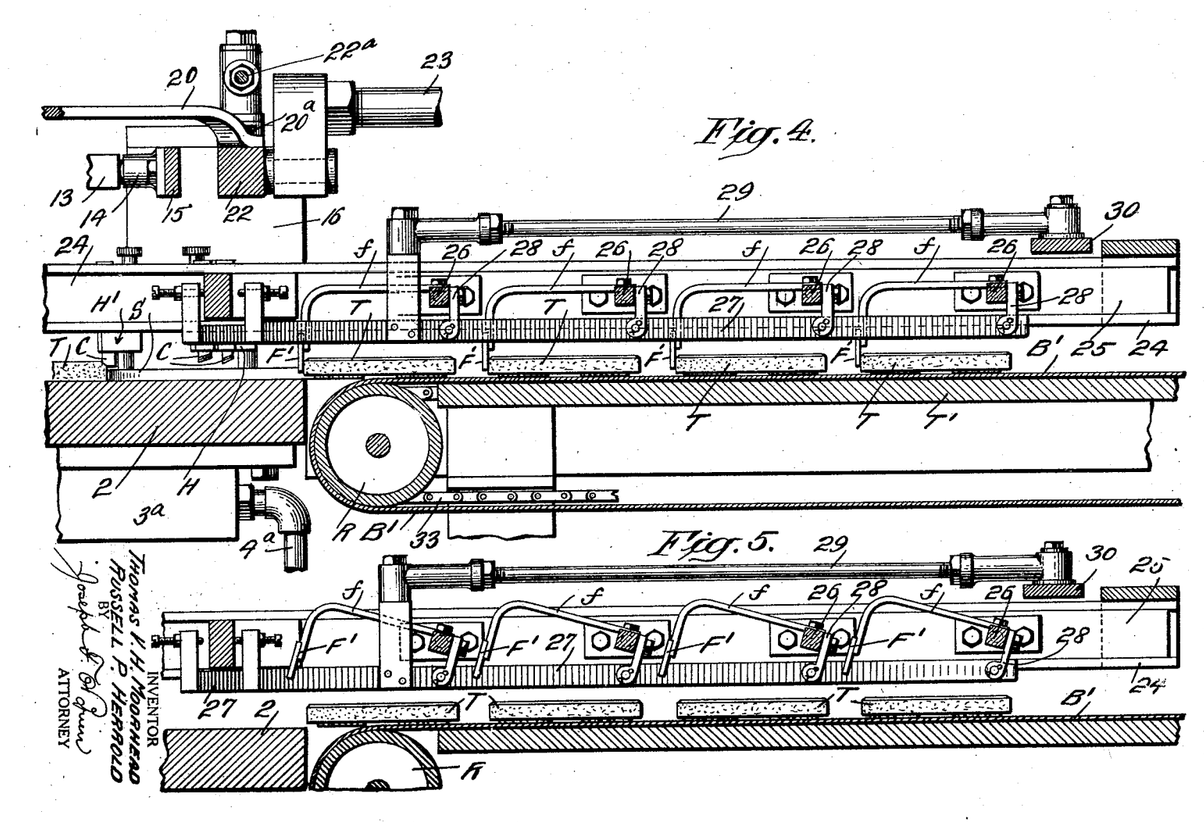
Figs. 4 and 5 are similar sections on the line 4—4 of Fig. 1 showing two positions of the engaging fingers.
Figures 6, 7:
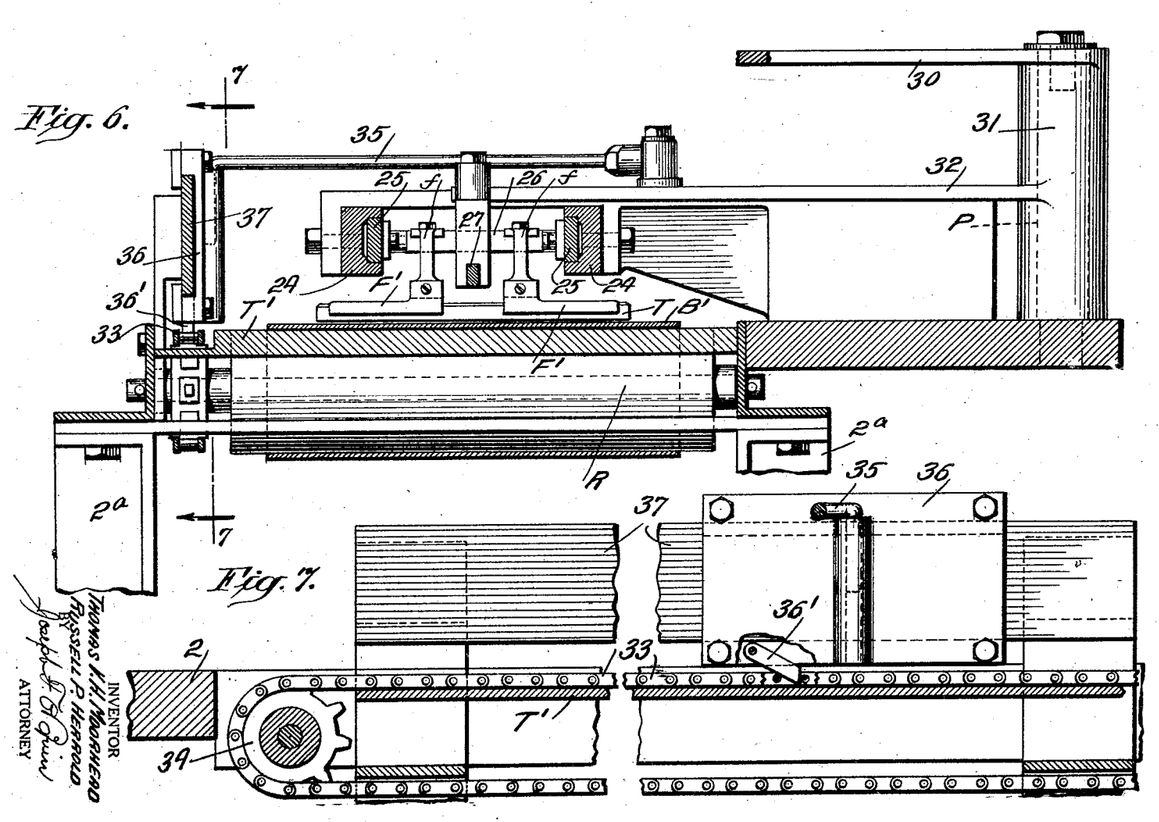
Fig. 6 is an enlarged vertical section on the line 6—6 of Fig. 1.
Fig. 7 is a section on the line 7—7 of Fig. 6 looking in the direction of the arrow.
Figure 8:
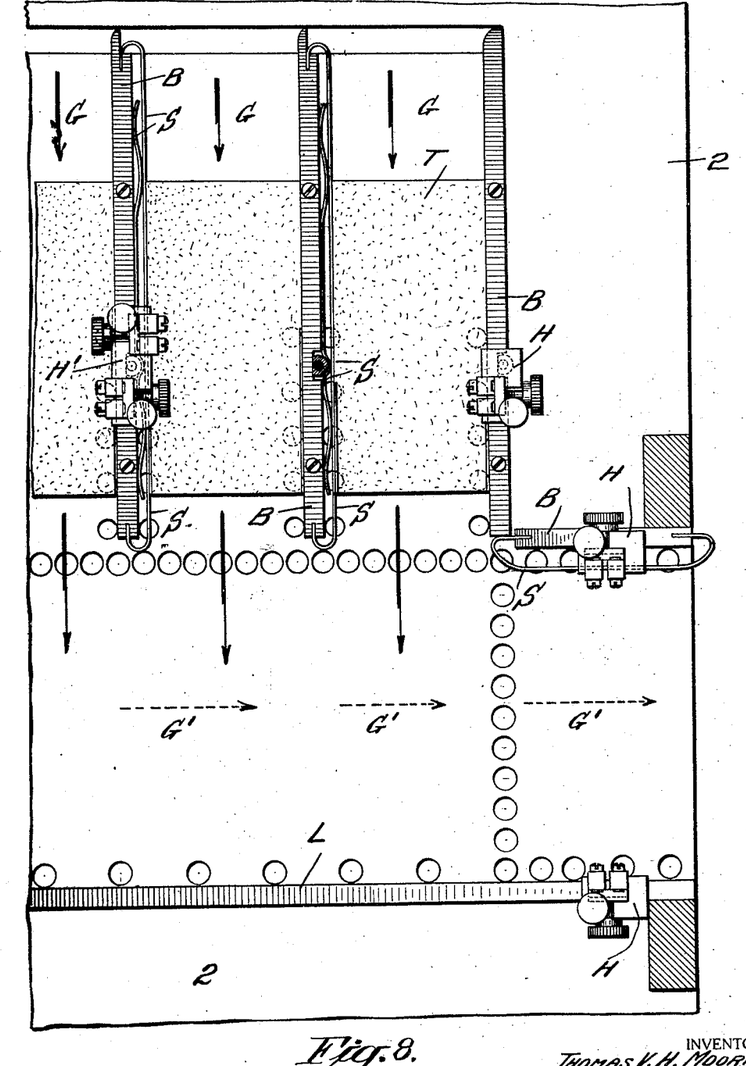
Fig. 8 is an enlarged plan view of the cutting table with the tile-moving mechanism omitted.
Figures 10, 11, 12, 13, 14:
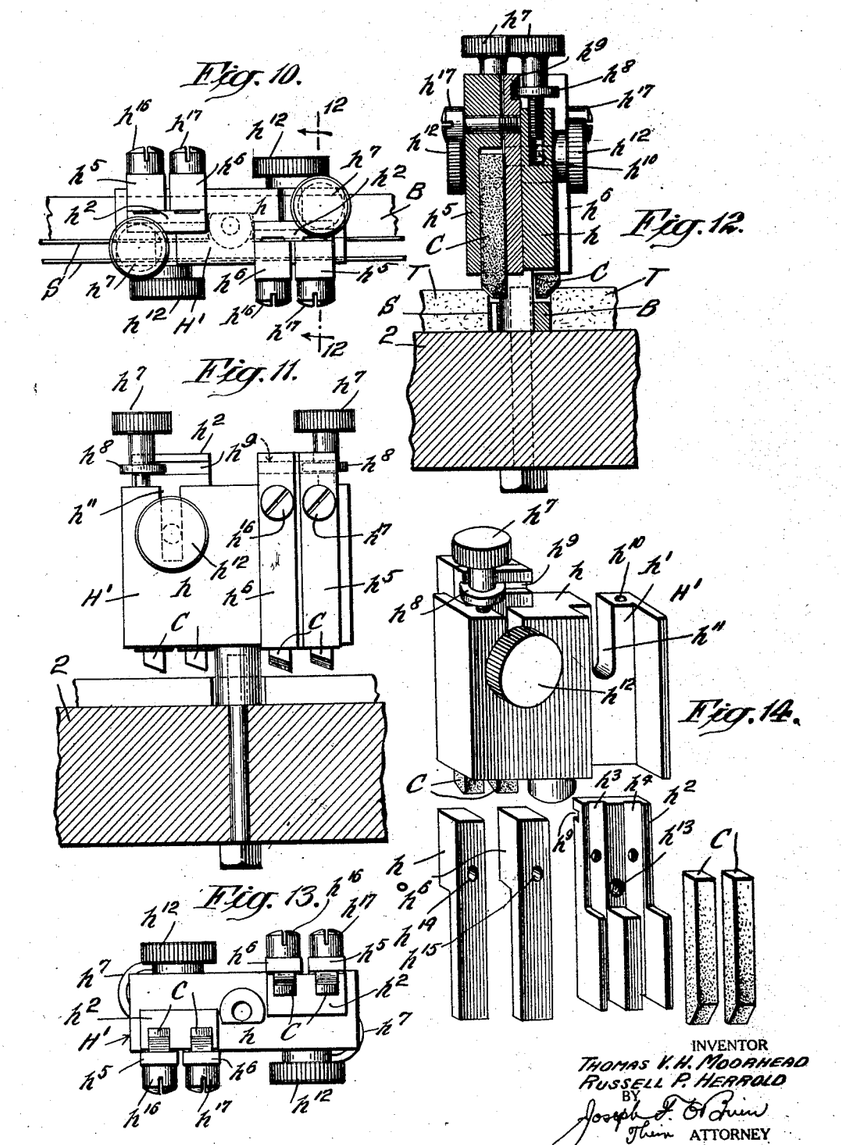
Fig. 10 is an enlarged plan view of preferred form of tool-holder used by us.
Fig. 11 is an enlarged view in side elevation of the said holder.
Fig. 12 is a section on the line 12—12 of Fig. 10 looking in the direction of the arrow.
Fig. 13 is a bottom view of our said tool-holder.
Fig. 14 is a view in perspective showing the parts for one pair of cutters dismounted and separated.

In the preferred form of operating mechanism illustrated, the rods 18 are connected together by a diagonal bar 20 and an end bar 21 which are, respectively, connected at 20ª and 21ª to another slide bar 22 extending parallel to the said finger-mounting slide-frame and also mounted in elevated position in the legs or brackets 2ª. The slide bar 22 may be reciprocated by any suitable mechanism and the movement thereof, in case of a power-operated press, is preferably synchronized with the mechanism of the press. In the preferred form illustrated, the bar 22 is reciprocated and synchronized with the movement of the press mechanism by a connection of such bar with such press mechanism by an arm 23 which, as shown, (see Fig. 2) is connected to the cam 9 of the press.

The preferred form of mechanism for moving the tiles T through the secondary movement thereof embodies a carriage or slide frame movable at right angles to the movement of the first mentioned carriage or slide frame and crossing the path of the latter, preferably in a different horizontal plane. As shown, the secondary slide frame or carriage is reciprocable in tracks or ways 24 below the primary slide-frame or carriage but above the trimming bed a sufficient distance to permit the fingers F of the primary frame to move the tiles T thereunder. The secondary carriage or slide frame comprises slide bars 25 movable within the grooved tracks 24 and, as shown, four rock-bars or axles 26 have their opposite ends mounted in bearings on said bars. These rock-bars each carry a pair of edge-engaging fingers F' on rods f and all of such fingers are simultaneously raised and lowered by the rocking of such rock bars or axles through the movement of a common longitudinally-extending actuating bar 27 connected to such bars or axles 26 by depending arms 28. Movement in one direction of said actuating bar first turns the rock bars 26 to lift the fingers F' and further movement of said actuating bar moves the carrier or slide frames with the fingers F' held in raised position. A reverse movement of such common actuating bar 27 causes the fingers F', through the connection of such bar with the said rock-bars 26, to be first lowered into engagement with the edges of the tile and continuance of such reverse movement causes the carriage to be then moved in the reverse direction. It is, of course, important to synchronize the movement of this secondary carriage with the primary carriage, and for this purpose the actuating bar is preferably reciprocated from the slide bar 22. As illustrated, the said actuating bar has pivotally connected thereto at its front end a rearwardly-extending arm 29 which is in turn pivotally connected to an arm 30 having a fixed connection with a rotatable head 31 pivotally mounted on a stationary vertical post P, which head has in turn an arm 32 pivotally connected through the pivoted rod 22ª with the main slide bar 22, the result being that movement of the slide bar rocks the two arms 30 and 32. The swinging end of the arm 30 moves the rearwardly-extending arm 29 which, as aforesaid, is connected to the actuating bar 27.

From the above it will be seen that the movement of the secondary carriage toward the path of the primary carriage will cause an initial automatic raising and a holding in elevated position of the fingers F', while the start of movement in the opposite direction will automatically lower the fingers F' to engage the side edges of the tiles T and further movement will retain the said fingers F' in such lowered position to positively engage and move the tile through the secondary trimming groove G', the single pair of cutters on each side of which successively trim the opposite edges of the series of tiles being handled.

It is desirable, after all four corners of the tiles T have been bevelled as above described, that they be examined and stacked by hand in receptacles and for this purpose a conveyor belt is preferably provided, which, in order to carry away the tiles as delivered by the secondary fingers F' preferably has its movement synchronized with the movement of the mounting slide or carrier for said fingers, and as illustrated a belt B' is mounted upon rollers R rotated by a chain 33 and sprockets 34. The belt B' is intermittently moved over table T' in synchronization with the secondary finger-mounting slide by an arm 35 which is pivotally connected to the rocking arm 30 and which synchronously moves a slide 36 on a stationary slide bar 37 extending parallel with said belt. Said slide 36 is provided with pawl mechanism 36' adapted to engage the belt during tile engaging movement in one direction synchronously with the secondary slide and to click over the links of the chain during the movement in the opposite direction to permit the belt to remain stationary during the reverse movement of such carrier. Obviously this movement of the belt will carry away the blocks as fast as the same are delivered thereto by the secondary slide and will permit examination of such tile blocks and a stacking thereof by hand or otherwise.

It will be seen that by the use of our invention we have not only enabled tile blocks and the like to be bevelled with greater speed and accuracy than has heretofore been possible by hand but we have, by the movement of the tile first in one direction and then in the direction at right angles thereto, occupied a minimum of space for said mechanism.

It is also desirable to brush from the surface and edges of the tiles any loose clay that may cling thereto, and in the embodiment shown we have mounted at the rear end of the machine across the path of the tiles as the same are moved by the conveyor belt a brush 38 having soft bristles engaging the top and bevelled edge surfaces of the tiles.

In Figs. 10 to 13 we have shown our preferred form of double holders H' for the carborundum cutters. These double holders are each adapted to hold two pairs of cutters and to position one pair on each side of a guide bar B. As illustrated, the holder H' comprises a Z-shaped body $h$ having two vertical grooves $h'$ opening in opposite directions and each adapted to receive a cutter-clamp composed of a carrier-member $h^2$, having a pair of vertical grooves $h^3$—$h^4$ and two cooperating clamp-members $h^5$—$h^6$ fitting within said grooves $h^3$—$h^4$ respectively. Between these members $h^5$—$h^6$ and the carrier members $h^2$ a pair of cutters C are clamped. Vertical adjusting movement is imparted to the cutter-clamp by providing a thumb screw $h^7$ having a screw-threaded washer $h^8$ fitting within a horizontal groove $h^9$ in the carrier member $h^2$, the end of the thumb screw $h^7$ bearing in a depression $h^{10}$ in the body portion $h$. Obviously when the thumb screw $h^7$ is rotated the washer $h^8$ will cause the carrier member $h^2$ with the cutters clamped thereon to be raised vertically in the groove $h'$ of the body $h$. Horizontal adjustment is afforded by providing the body portion with vertical slots $h^{11}$ and inserting through such slots thumb screws $h^{12}$ which take into tapped holes $h^{13}$ in the carrier member $h^2$. In order to fasten or clamp the cutters to the carrier member $h^2$, the members $h^5$ and $h^6$ are each provided with screw holes $h^{14}$—$h^{15}$ respectively into which are fitted screws $h^{16}$—$h^{17}$.

From the above it will be seen that the cutters are effectually clamped in position and may be adjusted both vertically and horizontally without removing the cutter holder from the machine.

The operation of the machine will be apparent from the foregoing description, it being merely necessary to say that the clay blocks or tile T immediately upon being moved forwardly by the slide 8 of the press on the trimming bed 1 will be engaged at their rear ends by the fingers F and slid along the trimming bed 1 through the grooves G until their forward ends engage the limiting stop L, whereupon the fingers F will be raised and moved in the opposite direction and the side edges of the tile blocks will thereupon be engaged by the fingers F' and slid on the trimming bed 1 at right angles to the said first movement through the groove G' and on to the upper surface of the conveyor belt B', whereupon the series of tile will be released and the fingers F' will be moved forwardly. During the sliding movement from the bed 1 on to the belt, said belt is moved a sufficient distance to enable the successive series of tiles to be disposed thereon without waste of space. It will also be understood that during each of such movements the corners formed between the upper surface and two parallel edges are bevelled and that all of these movements are synchronized with the movement of the tile by the press and with each other.

Having described our invention, we claim:—

1. A trimming machine for clay blocks, embodying a suitable trimming bed, cutters supported upon said bed, and means for successively and positively engaging the end and side edges of such clay blocks to successively move the same endwise and sidewise into engagement with the said cutters.

2. A trimming machine for clay blocks embodying a suitable trimming bed, cutters supported upon said bed to cause engagement of said cutters with the corners formed by the side and end edges of the clay block upon movement of the latter on said bed and means for positively engaging and causing movement relatively between such cutters and the clay blocks in a rectangular path.

3. A trimming machine for clay blocks embodying a suitable trimming bed, a series of cutters supported upon said bed, means for causing movement relatively between such cutters and clay blocks in a rectangular path, and means for mounting said cutters to cause a plurality of the same to engage each of the corners of the clay blocks formed by the intersection of the top surface with the side and end edges respectively.

4. A trimming machine for clay blocks embodying a suitable trimming bed, a series of cutters supported upon said bed, means for causing movement relatively between such cutters and clay blocks in a rectangular path, and means for successively engaging the side and end edges of the clay blocks and positively moving the corners formed by the intersection of the top surface with the side and end edges of such blocks respectively into engagement with the said cutters.

5. A trimming machine for clay blocks embodying a suitable trimming bed, a series of cutters supported upon said bed, means for successively engaging the end and side edges of such blocks to move the same in a rectangular path and means for mounting such cutters along such path to cause engagement of a plurality of such cutters with each of the corners of the clay block formed by the intersection of the top surface with the side and end edges thereof.

6. The combination with a press, of a trimming machine for clay blocks embodying a suitable trimming bed, cutters supported upon said bed, means for moving the clay blocks into the path of such cutters to cause the same to engage the corners of the clay blocks at opposite edges thereof to bevel the same, and means for synchronizing the movement of the block-moving means with the movement of the press mechanism.

7. The combination with a press, of a trimming machine for clay blocks embodying a suitable trimming bed, cutters supported upon said bed, means for moving the clay blocks in two directions at substantially right angles to each other and having contact with said cutters during each movement, and means for synchronizing the two movements of the block-moving means with the movement of the press mechanism.

8. In a trimming machine for clay blocks, the combination with a trimming-bed having a guide groove disposed in a predetermined line, another guide groove disposed at a right angle thereto, cutters arranged at the opposite sides of each of such guide grooves and means for moving clay blocks through such guide grooves into contact with the cutters.

9. In a trimming machine for clay blocks, the combination with a trimming-bed having a guide groove disposed in a predetermined line, another guide groove disposed at a right angle thereto, cutters arranged at the opposite sides of each of such guide grooves and means for positively engaging the end and side edges respectively of said clay blocks to move the same successively through said guide grooves and into contact with the cutters located therein.

10. In a trimming machine for clay blocks, the combination with a trimming-bed having a guide groove disposed in a predetermined line, another guide groove disposed at a right angle thereto, cutters arranged in pairs at the opposite sides of each of such guide grooves and means for positively engaging the end and side edges respectively of said clay blocks to move the same successively through said guide grooves and into contact with the cutters located therein.

11. In a trimming machine for clay blocks, the combination with a trimming bed having a plurality of guide grooves disposed in a predetermined line, a single guide groove disposed at a right angle thereto, cutters arranged at the opposite sides of each of such guide grooves and means for moving clay blocks through such guide grooves into contact with the cutters.

12. In a trimming machine for clay blocks, the combination with a trimming bed having a plurality of guide grooves disposed in a predetermined line, a single guide groove disposed at a right angle thereto, cutters arranged at the opposite sides of each of such guide grooves and means for positively engaging the end and side edges respectively of said clay blocks to move the same successively through said guide grooves and into contact with the cutters located therein.

13. In a trimming machine for clay blocks, the combination with a trimming bed having a guide groove disposed in a predetermined line, another guide groove disposed at a right angle thereto, two pairs of cutters arranged at the opposite sides of each of such guide grooves and means for moving clay blocks through such guide grooves into contact with said cutters.

14. In a trimming machine for clay blocks, the combination with a trimming bed having a guide groove disposed in a predetermined line, another guide groove disposed at a right angle thereto, two pairs of cutters arranged at the opposite sides of each of such guide grooves and fingers movable parallel to each of said grooves to engage the edges of the clay blocks and to positively move the same through such grooves into engagement with the cutters.

15. The combination with a power press of a trimming machine for clay blocks, embodying a trimming bed having a guide groove disposed in a predetermined line, another guide groove disposed at a right angle thereto, cutters arranged at the opposite sides of each of such guide grooves and fingers movable parallel to each of said grooves to engage the edges of the clay blocks to positively move the same through such guide grooves into engagement with the cutters, and means for imparting to said fingers a movement synchronized with the movement of the press mechanism.

16. A trimming machine for clay blocks embodying, in combination, a trimming bed having a plurality of parallel guide grooves disposed in a predetermined direction, a single guide groove disposed at an angle thereto, cutters arranged at the opposite sides of each of such guide grooves, two sets of edge-engaging fingers, the first set being movable in alignment with said plurality of parallel grooves and the other set being movable in alignment with the other angular groove to intersect the path of the first set of fingers, and means for imparting movement to both sets of fingers to cause the same successively to engage and move blocks through said angularly-disposed grooves and into contact with the cutters therein.

17. The combination with a power press of a trimming machine for clay blocks, embodying a trimming bed having a plurality of parallel guide grooves disposed in a predetermined direction, a single guide groove disposed at an angle thereto, cutters arranged at the opposite sides of each of such guide grooves, two sets of edge-engaging fingers, the first set being movable in alignment with said plurality of parallel grooves and the other set being movable in alignment with the other angular groove to intersect the path of the first set of fingers and means for imparting to said two sets of fingers reciprocating movements synchronized with the movement of the press and with each other to cause the blocks to be engaged upon delivery by the press and moved successively through said angularly-disposed grooves and into contact with the cutters therein.

18. A trimming machine for clay blocks embodying, in combination, a trimming bed having a plurality of grooves formed on said bed, a pair of cutters arranged at each of the opposite sides of each of such guide-grooves and fingers movable in alignment with said grooves for positively moving the clay blocks through such grooves into engagement with said pairs of cutters to take off initial and final cuts respectively from the said blocks.

19. The combination with a power press of a trimming machine for clay blocks, embodying a trimming bed having a plurality of grooves formed on said bed, a pair of cutters arranged at each of the opposite sides of each of such guide grooves, fingers movable in alignment with said grooves for positively moving the clay blocks through such grooves into engagement with said pairs of cutters to bevel the same, and means for synchronizing the movement of said fingers with the movement of the press mechanism.

20. The combination with a power press of a trimming machine for clay blocks, embodying a trimming bed having a plurality of grooves formed on said bed, cutters at opposite sides of such guide grooves, fingers movable in alignment with said grooves for positively moving the clay blocks through such grooves into engagement with such cutters to bevel the same, and means connected with the mechanism of the press for reciprocating such fingers in synchronization with the movement of the plunger and block-delivery mechanism of the press.

21. The combination with a power press of a trimming machine for clay blocks, embodying a trimming bed having a plurality of grooves formed on said bed, cutters at opposite sides of such guide grooves, fingers movable in alignment with said grooves for positively moving the clay blocks through such grooves into engagement with such cutters, means connected with the mechanism of the press for reciprocating such fingers in synchronization with the movement of the plunger and block-delivery mechanism of the press, and means for automatically raising such fingers at the beginning of one leg of the reciprocating movement and lowering such fingers at the beginning of movement in the opposite direction.

22. The combination with a power press of a trimming machine for clay blocks, embodying a trimming bed having a guide groove disposed in a predetermined line, another guide groove disposed at a right angle thereto, cutters arranged at the opposite sides of each of such guide grooves and fingers movable parallel to each of such grooves to engage the edges of the clay blocks to positively move the same through such guide grooves into engagement with the cutters, means for imparting to said fingers a movement synchronized with the movement of the press mechanism, and means for automatically raising and lowering such fingers during movement in opposite directions.

23. The combination with a power press of a trimming machine for clay blocks, embodying a trimming bed having a plurality of parallel guide groooves disposed in a predetermined direction, a single guide groove disposed at an angle thereto, cutters arranged at the opposite sides of each of such guide grooves, two sets of edge-engaging fingers, the first set being movable in alignment with said plurality of parallel grooves and the other set being movable in alignment with the other angular groove to intersect the path of the first set of fingers, means for imparting to said two sets of fingers reciprocating movements synchronized with the movement of the press and with each other to cause the blocks to be engaged upon delivery by the press and moved successively through said angularly-disposed grooves and into contact with the cutters therein, and means for automatically raising and lowering such fingers during movement in opposite directions.

24. The combination with a power press of a trimming machine for clay blocks, embodying a trimming bed having a plurality of grooves formed on said bed, cutters at opposite sides of such guide grooves, fingers movable in alignment with said grooves for positively moving the clay blocks through such grooves into engagement with such cutters, means connected with the mechanism of the press for reciprocating such fingers in synchronization with the movement of the plunger and block-delivery mechanism of the press, means for automatically raising such fingers at the beginning of one leg of the reciprocating movement and lowering such fingers at the beginning of movement in the opposite direction, and a conveyor belt arranged adjacent to said trimming bed and having its movement synchronized with the movement of the said fingers.

25. A trimming machine for clay blocks embodying a suitable trimming bed, cutters composed of a material having substantially the characteristics of carborundum supported on said bed, means for causing relative movement between such cutters and clay blocks, and holders for holding such cutters to cause the same to engage the corners of the clay blocks at opposite edges thereof, said holders being provided with means for adjusting the cutters vertically and horizontally.

26. A trimming machine for clay blocks embodying a suitable trimming bed having guide grooves formed thereon, cutters supported on said trimming bed and composed of a material having substantially the characteristics of carborundum, means for causing relative movement between such cutters and clay blocks, and a holder disposed to carry two pairs of cutters and to position the same on opposite sides of the wall of a groove, said holder being provided with means for adjusting the cutters vertically and horizontally.

27. The method of finishing clay blocks consisting in moving a clay block endwise, trimming the side edges during such endwise movement, then moving said block sidewise in a path at substantially a right angle to the path of endwise movement and trimming the end edges during such sidewise movement.

28. The method of finishing clay blocks consisting in pressing a plurality of clay blocks in a press, moving said blocks endwise, trimming the side edges during such endwise movement, then moving such clay blocks sidewise in a path at substantially a right angle to the path of endwise movement and trimming the end edges during such sidewise movement.

29. The method of finishing clay blocks consisting in pressing a plurality of clay blocks in a press, moving said blocks endwise together in parallel paths, trimming the side edges during such endwise movement, then moving all such clay blocks sidewise successively in a single path at substantially a right angle to the path of endwise movement and trimming the end edges during such sidewise movement.

30. The method of finishing clay blocks consisting in moving the clay blocks endwise, taking initial and final cuts from the upper longitudinal side edges during such endwise movement, then moving the clay blocks sidewise in a path at substantially a right angle to the path of endwise movement and taking initial and final cuts from the upper end edges of said block during such sidewise movement.

31. The method of finishing clay blocks consisting in pressing a plurality of clay blocks in a press, moving the said blocks endwise, taking initial and final cuts from the upper longitudinal side edges during such endwise movement, then moving the clay blocks sidewise in a path at substantially a right angle to the path of endwise movement and taking initial and final cuts from the upper end edges of said block during such sidewise movement.

32. The method of finishing clay blocks consisting in pressing a plurality of clay blocks in a press, moving the said blocks endwise together in parallel paths, taking initial and final cuts from the upper longitudinal side edges during such endwise movement, then moving all the clay blocks sidewise successively in a single path at substantially a right angle to the path of endwise movement and taking initial and final cuts from the upper end edges of said block during such sidewise movement.

33. The method of finishing clay blocks consisting in moving the clay blocks endwise, bevelling the corners at the side edges during such endwise movement, then moving the clay blocks sidewise in a path at substantially a right angle to the path of endwise movement and bevelling the corners at the end edges during such sidewise movement.

34. The method of finishing clay blocks consisting in pressing a plurality of clay blocks in a press, moving the said blocks endwise, bevelling the corners at the side edges during such endwise movement, then moving the clay blocks sidewise in a path at substantially a right angle to the path of endwise movement and bevelling the corners at the end edges during such sidewise movement.

35. The method of finishing clay blocks consisting in pressing a plurality of clay blocks in a press, moving the said blocks endwise together in parallel paths, bevelling the corners at the side edges during such endwise movement, then moving all the clay blocks sidewise successively in a single path at substantially a right angle to the path of endwise movement and bevelling the corners at the end edges during such sidewise movement.

In witness whereof, we have signed our names to the foregoing specification.

RUSSELL P. HERROLD.
THOMAS V. H. MOORHEAD.